US008385450B2

(12) United States Patent
Valadon (10) Patent No.: US 8,385,450 B2
(45) Date of Patent: Feb. 26, 2013

(54) METRICS CALCULATIONS UTILIZING PRE-STORED VALUES

(75) Inventor: Cyril Valadon, Hertfordshire (GB)

(73) Assignees: MStar Semiconductor, Inc., Grand Cayman (KY); MStar Software R&D (Shenzhen) Ltd., Shenzhen (CN); MStar France SAS, Issy les Moulineaux (FR); MStar Semiconductor, Inc., Taiwan (CN)

( * ) Notice: Subject to any disclaimer, the term of this patent is extended or adjusted under 35 U.S.C. 154(b) by 0 days.

(21) Appl. No.: 13/106,616

(22) Filed: May 12, 2011

(65) Prior Publication Data

US 2011/0211661 A1    Sep. 1, 2011

Related U.S. Application Data

(63) Continuation of application No. 11/662,301, filed as application No. PCT/GB2005/003496 on Sep. 9, 2005.

(30) Foreign Application Priority Data

Sep. 10, 2004  (GB) .................................. 0420183.6

(51) Int. Cl.
*H04L 5/12* (2006.01)
*H04L 23/02* (2006.01)
(52) U.S. Cl. ......... 375/265; 375/259; 375/260; 375/261
(58) Field of Classification Search .................... 375/265
See application file for complete search history.

(56) References Cited

U.S. PATENT DOCUMENTS

| 5,127,025 | A | 6/1992 | Okanoue |
|---|---|---|---|
| 5,263,033 | A | 11/1993 | Seshadri |
| 5,475,713 | A | 12/1995 | Bremer et al. |
| 6,097,753 | A | 8/2000 | Ko |
| 6,118,816 | A * | 9/2000 | Meyer et al. .................. 375/233 |
| 6,275,525 | B1 | 8/2001 | Bahai et al. |
| 6,341,360 | B1 | 1/2002 | Abdelilah et al. |
| 6,381,267 | B1 | 4/2002 | Abdelilah et al. |
| 6,389,064 | B1 | 5/2002 | Dholakia et al. |
| 6,426,972 | B1 | 7/2002 | Endres et al. |
| 6,487,243 | B1 | 11/2002 | Hwang et al. |
| 6,505,222 | B1 | 1/2003 | Davis et al. |
| 6,658,071 | B1 | 12/2003 | Cheng |
| 6,665,336 | B2 | 12/2003 | Abdelilah et al. |
| 6,707,849 | B1 | 3/2004 | Zangi et al. |
| 6,744,814 | B1 | 6/2004 | Blanksby et al. |

(Continued)

FOREIGN PATENT DOCUMENTS

CN    1516518    7/2004
EP    1427159 A2    6/2004

(Continued)

*Primary Examiner* — Erin File
(74) *Attorney, Agent, or Firm* — Edell, Shapiro & Finnan, LLC (57) ABSTRACT

A trellis processing technique for estimating a transmitted signal from a received signal acquired through a channel achieves a reduced computational structure when implementing a DDFSE-like branch metrics calculation by pre-storing computed values, which can be re-used. The technique involves storing differences between a received symbol and different products, each of which is a product of a channel coefficient corresponding to a least time delay and a different possible transmitted symbol. A summation of products is calculated, each product being a product of a possible transmitted signal symbol and a channel coefficient other than the channel coefficient corresponding to the least time delay, the summation being specific to a branch-start state in a trellis. The summation is combined with different stored differences in a calculation of branch metrics leading to different branch-end states in the trellis.

5 Claims, 6 Drawing Sheets

U.S. PATENT DOCUMENTS

| | | |
|---|---|---|
| 6,792,040 B1 | 9/2004 | Davis et al. |
| 7,003,030 B2 | 2/2006 | Abdelilah et al. |
| 7,254,190 B2 | 8/2007 | Kwentus et al. |
| 7,277,506 B1 | 10/2007 | Pope et al. |
| 7,464,316 B2 | 12/2008 | Bickerstaff et al. |
| 2001/0007142 A1* | 7/2001 | Hocevar et al. ............... 714/795 |
| 2002/0083396 A1 | 6/2002 | Azadet et al. |
| 2004/0071243 A1* | 4/2004 | Agazzi et al. ................. 375/348 |
| 2004/0091038 A1* | 5/2004 | Agazzi et al. ................. 375/233 |
| 2004/0181738 A1* | 9/2004 | Agazzi et al. ................. 714/767 |
| 2004/0202231 A1* | 10/2004 | Wang et al. ................... 375/148 |
| 2005/0038841 A1 | 2/2005 | Nair et al. |
| 2005/0105658 A1 | 5/2005 | Haratsch |
| 2005/0135522 A1* | 6/2005 | Becker ......................... 375/350 |
| 2005/0147182 A1 | 7/2005 | Lee et al. |
| 2005/0152263 A1* | 7/2005 | Speth ........................... 370/203 |
| 2006/0146963 A1 | 7/2006 | Valadon |
| 2008/0274727 A1* | 11/2008 | Axnas et al. .................. 455/423 |

FOREIGN PATENT DOCUMENTS

| | | |
|---|---|---|
| WO | 0010299 A1 | 2/2000 |
| WO | 0044141 A1 | 7/2000 |
| WO | 03041349 A1 | 5/2003 |

* cited by examiner

METRICS CALCULATIONS UTILIZING PRE-STORED VALUES

CROSS REFERENCE TO RELATED APPLICATIONS

This application is a continuation of U.S. patent application Ser. No. 11/662,301 filed on Mar. 9, 2007, entitled "Metrics Calculations Utilising Pre-Stored Values," which is a National Stage Entry of International Application No. PCT/GB05/03496, filed on Sep. 9, 2005, entitled "Metrics Calculations Utilising Pre-Stored Values," which claims priority under 35 U.S.C. §119 to Application No. GB 0420183.6 filed on Sep. 10, 2004, entitled "Metrics Calculations Utilising Pre-Stored Values," the entire contents of each of which is hereby incorporated by reference.

BACKGROUND OF THE INVENTION

In mobile communication systems, the transmission link suffers from a number of impairments. Two such effects are thermal noise and multipath fading.

Multipath fading can result in Intersymbol Interference (ISI) at the receiver if the delay spread of the channel is larger than the modulation period ("Digital Communications," Proakis, $2^{nd}$ Edition, McGraw-Hill). Hence, in a given propagation environment, ISI will become more of a problem as the transmission rate increases. For communication systems aimed at providing medium to high data rate services, the presence of ISI can severely limit the link throughput and degrade the quality of service experienced by the user.

Some digital communication systems also introduce ISI by design. This is the case in the E-GPRS system, where the modulation pulse shape used to improve the spectral efficiency of the transmitted signal generates ISI. For more information, see 3GPP TS 05.04 V8.4.0 (2001-11), Technical Specification 3rd Generation Partnership Project; Technical Specification Group GSM/EDGE Radio Access Network; Digital cellular telecommunications system (Phase 2+); Modulation.

Another source of performance degradation experienced by a user of a Time-Division, Multiple-Access (TDMA) cellular communication system is interference generated by other users in the system using the same carrier or adjacent carriers. These interference effects, referred to as co-channel interference and adjacent channel interference respectively, can greatly reduce the capacity of a cellular system.

All of the impairments described above make it difficult for a receiver to reliably recover information that a transmitted signal intended to convey, leading to the use in receivers of complex algorithms for demodulating received signals. The implementation complexity of such algorithms will have a significant impact on a digital receiver in terms of overall silicon die size, processor speed, power consumption and memory requirements. Hence, the use of an efficient receiver architecture offering good transmission link performance is of considerable importance.

In order to improve the reliability of a communication link, Forward Error Correction (FEC) coding can be embedded in a transmitted signal. An FEC coding operation introduces redundancy to a transmitted signal and this redundancy can then be used at a receiver to improve the accuracy of estimates of the transmitted data that are generated by the receiver. However, for FEC coding in a transmitted signal to be most beneficial, it is important that such a signal is demodulated by a receiver in a format which can be best interpreted by an FEC decoding process within the receiver. A number of such receivers have been proposed in the past. See, for example, "Optimal decoding of linear codes for minimizing symbol error rate," L. Bahl, J. Cocke, F. Jelinek, J. Raviv, IEEE Trans. on Information Theory, Volume: 20, March 1974; "A Viterbi algorithm with soft-decision outputs and its applications," J. Hagenauer, P. Hoeher, GLOBECOM'89, Dallas, November 1989; "On the equivalence between SOVA and Max-Log MAP decodings," M. P. C. Fossorier, F. Burkert, S. Lin and J. Hagenauer, IEEE Communications Letters, vol. 2, no. 5, May 1998; "Soft information in concatenated codes," B. Rislow, T. Maseng, O. Trandem, IEEE Trans. on Communications, Vol. 44, Issue 3, March 1996; and "TCM on frequency-selective fading channels: a comparison of soft-output probabilistic equalizers," P. Hoeher, GLOBECOM '90, December 1990. However, the implementation complexity of such prior receiver architectures is usually high.

SUMMARY OF THE INVENTION

According to one aspect, the invention provides trellis processing apparatus comprising means for pre-storing different products of channel coefficient values and signal symbol values and means for calculating a branch metric utilizing one or more of said pre-stored products.

The invention also consists in a trellis processing method comprising pre-storing different products of channel coefficient values and signal symbol values and calculating a branch metric utilizing one or more of said pre-stored products.

In certain embodiments, a reduced state trellis technique, such as DDFSE, is used, providing groups of hypothesized and hard symbol decisions associated with each trellis states. These groups can contain just a single symbol decision.

The invention is can be realized in hardware or as software on a processor, or a combination thereof.

In certain aspects, the invention relates to a reduced state trellis. Such a trellis is one in which the hypothesized variables making up the state descriptions are converted to definite decisions to reduce the number of states present in the trellis. Such trellises are processed by, for example, RSSE and DFSE demodulator architectures.

BRIEF DESCRIPTION OF THE DRAWINGS

By way of example only, certain embodiments of the invention will now be described with reference to the accompanying figures, in which.

DETAILED DESCRIPTION

In order to describe the computations performed by a receiver, it is first necessary to present a model of the transmission link in which the receiver participates. A suitable model is presented in FIG. 1 and will now be described in some detail. This model assumes that the information is transmitted in blocks of bits rather than as a continuous stream.

However, it should be noted that the invention described later in this document is applicable to both types of transmission.

Figure 1:
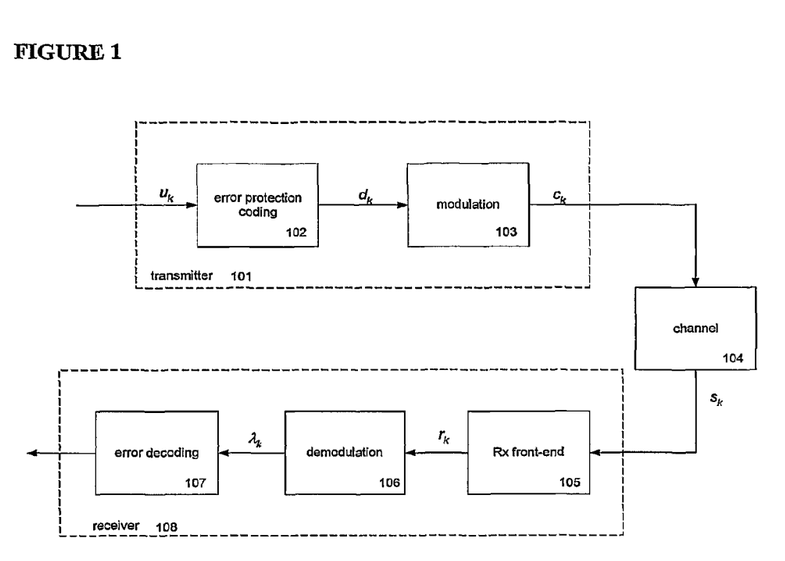
FIG. 1 presents a model of a communication link.

On the transmitter side 101, the information signal is processed by an error-protection coding unit 102 and a modulation unit 103. The generated signal then goes through a propagation channel 104 and the resulting signal is acquired by a receiver 108 which then attempts to recover the information signal.

According to the model, a transmission block $\{u_k\}_{k \in (1, \ldots, K)}$ is made of K information bits, $u_k \in \{0,1\}$. Error protection is added to these bits in order to improve the reliability of the transmission. The error protection coding unit 102 generates from the block $\{u_k\}|_{k \in (1, \ldots, K)}$ a transmission block $\{d_k\}_{k \in (1, \ldots, D)}$ made of D (where D>K) information bits, $d_k \in \{0,1\}$.

A number of different techniques can be used by unit 102 for the error protection coding process. For example, in the E-GPRS system, convolutional codes with varying coding rates are used by the transmitter. Interleaving and bit reordering techniques can also be used in order to improve the resilience of the receiver to bursts of errors.

In the modulation unit 103, the information bits $d_k$ are grouped into C sets of M bits (it can be assumed, without loss of generality, that D=M×C). Each of these sets can be denoted $\Delta_k$, where $\Delta_k = \{d_{M \times k}, \ldots, d_{(M \times k)+(M-1)}\}$.

Each set of M information bits $\Delta_k$ is modulated onto the complex plane using a modulation scheme M that maps sets of M bits onto the complex plane. This mapping is performed by a modulation unit 103. For example, in the case of an 8 PSK modulation, the modulation M can be expressed as:

$$M(\Delta_k) = M(\{d_{3 \times k}, d_{3 \times k+1}, d_{3 \times k+2}\})$$
$$= \exp\left(2 \cdot j \cdot \pi \times \left(\frac{(4 \cdot d_{3 \times k}) + (2 \cdot d_{3 \times k+1}) + 1 \cdot d_{3 \times k+2}}{8}\right)\right)$$

A slightly modified version of the 8 PSK modulation described by the above equation is used in the E-GPRS system.

A set of M information bits $\{d_{M \times 5}, \ldots, d_{(M \times k)+(M-1)}\}$ can be uniquely identified with a single decimal number i $\{0 \leq i \leq 2^{M-1}\}$ calculated using the one-to-one function D described in the following equation:

$$D(\{d_0 \ldots, d_{M-1}\}) = \sum_{i=0}^{M-1} d_i \times 2^i$$

This equation maps the M binary values in a set $\Delta_k$ to a unique value in the set $\{0, \ldots, 2^{M-1}\}$. The set of information bits $d_b (b \in \{0, \ldots, M-1\})$ that verify the above equation for a given value of i can be denoted $D_b^{-1}(i)(b \in \{0, \ldots, M-1\})$.

The C modulated symbols representing a transmission block are transmitted over the air and in the process are distorted by the propagation channel 103. Assuming a general model with memory for the propagation channel, the samples $\{s_k\}_{k \in (1, \ldots, C)}$ at the input of a receiver can be expressed as:

$$\begin{cases} s_k = F(c_k, \xi_{k-1}) \\ \xi_k = S(c_k, \xi_{k-1}) \end{cases}$$

Here, $c_k = M(\Delta_k)$ and $\xi_k$ represents the state (memory) of the propagation channel when the $k^{th}$ modulated symbol is transmitted. Note that any filtering performed by either the transmitter and/or the receiver can be incorporated in the propagation channel model. The mappings F and S used to model the propagation channel can be time varying. However, to simplify the notations, it is assumed in this document that these mappings do not depend on time. Note, however, that the approach described here is also applicable to time-varying channels.

In most cases, the propagation channel mappings F and S can be modeled as linear filtering operations:

$$\begin{cases} s_k = \sum_{i=0}^{L-1} h_i \times c_{k-i} \\ \xi_k = \{c_k, \ldots, c_{k-L+1}\} \end{cases}$$

In the above example, it is assumed that the memory of the channel is limited to L modulated symbols. In reality, the memory of the channel may be infinite. However, for any desired power threshold T, it is usually possible to find a value L such that:

$$\left(\sum_{k \geq i} |h_k|^2\right) \leq T \text{ for } i \geq L - 1$$

Hence, by selecting the threshold T such that the residual power is low enough, it is possible to assume that the channel memory is limited. When this is done, the channel mapping can be described with just a set of filter coefficients $\{h_i\}_{i \in \{0, \ldots, L-1\}}$.

In the model described here, it has been assumed, without loss of generality, that the filter representing the channel propagation is causal.

In order to recover the transmitted symbols $c_k$, the receiver will need to know the propagation channel mapping. However, the receiver will usually not have prior knowledge of the propagation channel conditions. It may nevertheless be possible for the receiver to generate estimates of the channel coefficients $\{h_i\}_{i \in \{0, \ldots, L-1\}}$ which can be used in place of the true values. For example, in the EGPRS system, a transmitted signal will incorporate a pattern, referred to as training sequence, which is known to the receiver and the receiver can use this training sequence to generate an estimate of the propagation channel conditions.

At the receiver 108, the signal $\{s_k\}_{k \in (1, \ldots, C)}$ is first processed by the signal conditioning unit 105, a receiver front-end, to generate a new sequence of received symbols $\{r_h\}_{k \in (1, \ldots, C)}$ that is input to a demodulation unit 106.

The demodulation unit 106 derives estimates of the Log-Likelihood Ratios (LLRs) of the coded bits. The LLR of the coded bit $d_k$ is expressed as:

$$\lambda_k = \log\left(\frac{P(d_k = 1 \mid R)}{P(d_k = 0 \mid R)}\right)$$

where k belongs to the set $\{1, \ldots, C\}$ and R denotes the set $\{r_k\}_{k \in (1, \ldots, C)}$.

The LLRs are then input to an error-decoding unit 107 which generates estimates of the transmitted information sequence, $\{u_k\}_{k \in (1, \ldots, K)}$.

Figure 2:
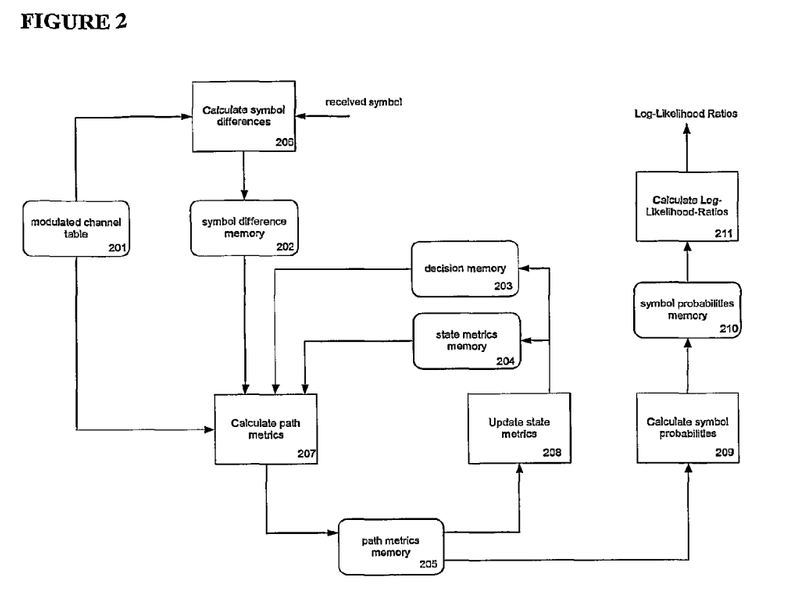
FIG. 2 describes one possible implementation of the proposed invention.

FIG. 2 illustrates a demodulation architecture that can be used to implement the demodulation unit 106 of FIG. 1. The demodulator architecture shown in FIG. 2 is derived from the Delayed Decision Feedback Sequence Estimation (DDFSE) approach presented in "Delayed decision-feedback sequence estimation," A. Duel-Hallen, C. Heegard, IEEE Trans. on Communications, Vol. 37, Issue 5, May 1989. It will, however, be apparent to one skilled in the art that the demodulator architecture that will shortly be described in conjunction with FIG. 2 can also be extended to different equalization approaches, of which an example is Reduced State Sequence Estimation (RSSE) as described in "Reduced-state sequence estimation for coded modulation of intersymbol interference channels," M. V. Eyuboglu, S. U. H. Qureshi, IEEE Journals on Selected Areas in Communications, Volume: 7, Issue: 6, August 1989.

In order to facilitate the description of the demodulator architecture of FIG. 2, it is first useful to describe the computations involved in a demodulator architecture using a "full trellis" approach and then the computations involved in a DDFSE demodulator architecture. The different computations involved in "full trellis" and DDFSE Viterbi processing will not be detailed and only those computations that facilitate the description of the invention will be presented. For a more detailed description of the computations involved in a "full trellis" demodulator architecture, see, for example, "TCM on frequency-selective fading channels: a comparison of soft-output probabilistic equalizers," P. Hoeher, GLOBECOM '90, December 1990. For a more detailed description of the computations involved in a DDFSE demodulator architecture, see, for example, "Delayed decision-feedback sequence estimation," A. Duel-Hallen, C. Heegard, IEEE Trans. on Communications, Vol. 37, Issue 5, May 1989. The computations involved in a demodulator architecture using a "full trellis" approach will now be described.

In a "full trellis" Viterbi demodulator, the number of states in the trellis used to perform the Viterbi decoding, denoted S, is equal to $2^{M \times L}$. Moreover, any given state in the trellis has $2^M$ "merging states" leading into it.

When the symbol $r_k$ is received, the metrics associated with the different states in the trellis are updated according to the equation:

$$\gamma_m(k+1) = \max_{i=0,\ldots,2^{kf}-1} \{\chi_m^{k+1}(i)\} \quad 0 \le m \le S-1$$

The candidate metrics $\chi_m^{k+1}(i)$ are calculated using the state metrics from the previous iteration with the recursive equation:

$$\chi_m^{k+1}(i) = \gamma_{p(m,i)}(k) - B(r_k, p(m,i), m)$$

Here, $p(m,i)$ $\{0 \le m \le S-1; 0 \le i \le 2^{M-1}\}$ is the index of the state leading into the state with index m in the path that corresponds to a hypothesis transmitted complex symbol $\tilde{c}$ equal to $M(D^{-1}(i))$.

The branch metrics are calculated using the following equation:

$$B(r_k, p(m,i), m) = \left| r_k - \sum_{u=0}^{L-1} h_u \times \tilde{c}_{k-u} \right|^2$$

As a "full trellis" approach is being used, the hypothesis samples $\tilde{c}_{k-u}$ used in the above branch metric calculation are taken from the states $p(m,i)$ and m that the branch metric interconnects. The candidate metrics $\chi_m^{k+1}(i)$ are then used to calculate LLRs in a known manner. The computations involved in a demodulator architecture using a DDFSE approach will now be described.

In a DDFSE demodulator architecture, a reduction in the number of trellis states is achieved by splitting the channel into two sections. The first section of the channel (with length $L_f$) is processed in a way similar to the full-state approach. However, for the remainder of the channel (with length $L_r$ such that $L=L_f+L_r$), the modulated symbols derived from previous decisions are used rather than testing all the possible hypotheses. Using this method, the number of states for which trellis processing is performed is reduced from $2^{M \times (L-1)}$ to $2^{M \times (L_f-1)}$. To reflect this change in the number of states, the branch metric computations need to be modified as follows:

$$B(r_k, p(m,i), m) = \left| r_k - \sum_{u=0}^{L_f-1} h_u \times \tilde{c}_{k-u} - \sum_{u=L_f}^{L_f+L_r-1} h_u \times \hat{c}_{k-u}(p(m,i)) \right|^2$$

It can be seen from the above equation that the computations involving the first $L_f$ taps are identical to those performed in the full trellis approach. However, for the last $L_r$ taps, the hypothesis symbols $\tilde{c}_{k-u}$ are replaced by hard decision symbols $\hat{c}_{k-u}(p(m,i))$. These hard decision symbols are generated using the decisions that are taken during the selection of candidate metrics to become new state metrics in accordance with the equation:

$$\gamma_m(k+1) = \max_{i=0,\ldots,2^M-1} \{\chi_m^{k+1}(i)\} \quad 0 \le m \le S-1$$

This equation is also used in the "full trellis" approach. The hard decision symbols are associated with each state in the trellis and are updated as the state metrics are updated such that the selection involved in determining $\gamma_m(k+1)$ determines $\hat{c}_k(m)$.

Figure 5:
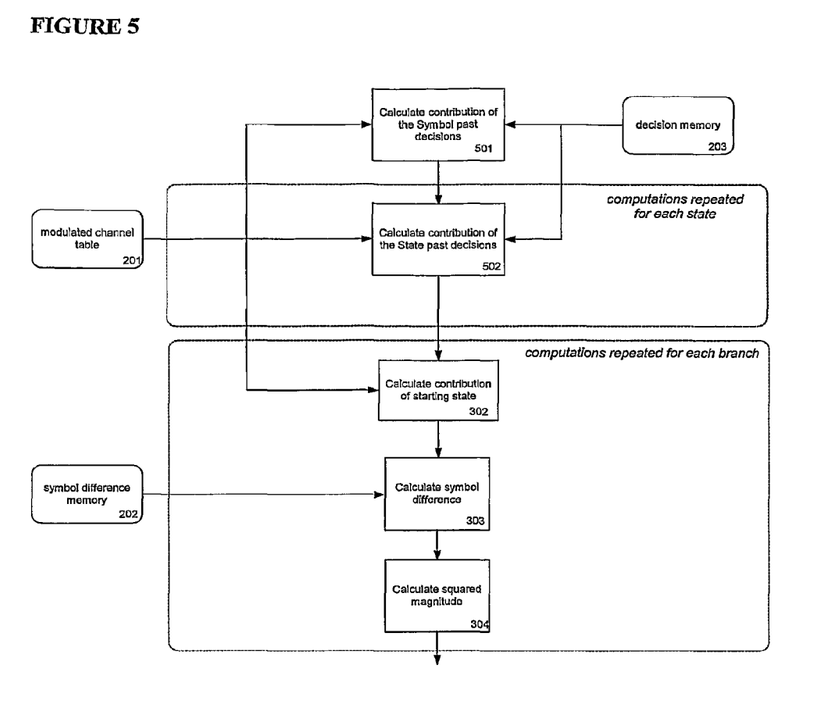
FIG. 5 presents an implementation of the branch metric computation that is an alternative to that shown in FIG. 3.

The demodulator architecture of FIG. 2, which will now be described, is based on the DDFSE approach. The architectures shown in FIGS. 2 and 3 and FIGS. 2 and 5 can be implemented as software using a suitable data processor in conjunction with suitable memory resources.

The demodulator architecture of FIG. 2 achieves a significant reduction in complexity by separating the sequence of L channel coefficients $\{h_i\}_{i \in \{0,\ldots,L-1\}}$ into two distinct sections in the same manner as the DDFSE technique. For the first $L_f$ channel coefficients, all possible hypotheses for the modulated symbols are tested. For the remaining $L-L_f=L_r$ channel coefficients, however, the different hypotheses are replaced for each state by a single value derived from previous decisions. By so doing, the number of states in the trellis, denoted as S, is reduced from $2^{L-1}$ down to $2^{L_f-1}$. It is to be noted, however, that this reduction in the number of states to be processed in the demodulation architecture of FIG. 2 can lead to a significant performance reduction. It is therefore important that prior to the trellis processing, the signal is conditioned properly. Such a signal conditioning technique is described in "Equalization Concepts for EDGE," W. H. Gerstacker, R. Schober, IEEE Trans. on Wireless Communications, January 2002.

When the symbol $r_k$ is received, the state metrics associated with the different states in the trellis are updated in the demodulation architecture of FIG. 2 according to the following equation:

$$\gamma_m(k+1) = \max_{i=0,\ldots,2^M-1} \{\chi_m^{k+1}(i)\} \quad 0 \leq m \leq S-1$$

Note that, for a given modulation scheme M, there exists a one-to-one relationship, denoted H(m), between each state index m and the set of hypotheses $\{\tilde{c}_k, \ldots, \tilde{c}_{k-L_{f+2}}\}$ for the transmitted information symbols. H is a function that maps a value from the set $\{0, \ldots, S-1\}$ to a value in a set of $L_r-1$ complex numbers. The total number of candidate metrics in the trellis is equal to $S \times 2^M$.

It should also be noted that it is possible to add or subtract any value, constant over the different states, to this update without changing the soft decisions generated by the algorithm. Such an approach may be used when the proposed receiver architecture is implemented using fixed-point number representation in order to reduce the computational complexity.

The candidate metrics $\chi_m^{k+1}(i)$ are calculated in the demodulation architecture of FIG. 2 using the state metrics from the previous iteration with the recursive equation:

$$\chi_m^{k+1}(i) = \gamma_{p(m,i)}(k) - B(r_k, p(m,i), m)$$

Here, $p(m,i)$ $\{0 \leq m \leq S-1; 0 \leq i \leq 2^{M-1}\}$ is the index of the state leading into the state with index m along the path that corresponds to a hypothesis transmitted complex symbol $\tilde{c}$ equal to $M(D^{-1}(i))$. The calculation of the branch metrics B will be described shortly. Each branch metric, and each candidate metric, in the trellis is associated with a unique set of hypotheses for the modulation symbols $\{\tilde{c}_k, \ldots, \tilde{c}_{k-L_f+1}\}$. For a given received symbol index k, the $L_f$ symbols which are uniquely associated with the ending state with index m and the modulation symbol index i are denoted as $\zeta(m,i,\delta) = \tilde{c}_{k-\delta}$ $0 \leq \delta \leq L_f - 1$ The branch metrics are calculated in the demodulation architecture of FIG. 2 using the equation:

$$B(r_k, p(m,i), m) = \left| r_k - \sum_{u=0}^{L_f-1} h_u \times \tilde{c}_{k-u} - \sum_{u=L_f}^{L_f+L_r-1} h_u \times \hat{c}_{k-u}(p(m,i)) \right|^2$$

The modulation symbols $\hat{c}_{k-u}(p(m,i))$ are derived from previous decisions from the trellis processing. Their actual computation will be described in a latter part of this document.

Note that the branch metric described in the above equation can be calculated in other ways. It is possible to modify the computation of the branch metric, based on, for example, knowledge of, or an estimation of, the statistical distribution of noise affecting the transmitted block. It is also possible to change the subtraction in the equation for $X_m^{k+1}(i)$ into an addition. This may be useful if the processor on which the demodulator architecture of FIG. 2 is being implemented contains dedicated 'minimum finding' instructions.

In the demodulation architecture of FIG. 2, estimates of the A-Posteriori probabilities, computed in the logarithmic domain, of the $2^M$ different modulation symbols are derived from the candidate metrics using the following equation:

$$\xi_i = \log(P(c_k = M(D^{-1}(i)) \mid R))$$
$$\approx \max(\chi_m^{k+1}(j))$$
$$0 \leq m \leq S-1$$

$$0 \leq j \leq 2^M - 1$$

$$\zeta(m, j, L_f - 1 = c$$

The set of computations specified by the above equation for deriving the symbol A-Posteriori probabilities is not optimum in terms of demodulation performance. However, it is significantly less complex than the optimum approach (as described in "Optimal decoding of linear codes for minimizing symbol error rate," L. Bahl, J. Cocke, F. Jelinek, J. Raviv, IEEE Trans. on Information Theory, Volume: 20, March 1974) and the performance loss is kept to an acceptable level in most conditions.

Moreover, it should be noted that, in the above equation for $\xi_i$, only the maximum candidate metric is used to derive the symbol A-Posteriori probabilities. It is, however, possible for someone skilled in the art to modify the equation to include all the candidate metrics, rather than just the maximum one.

The LLRs for the set of transmitted bits $\{d_{M \times (k-L+1)}, \ldots, d_{M \times (k-L+1)+M-1}\}$ can then be estimated in the demodulation architecture of FIG. 2 from the symbol A-Posteriori probabilities using the equation:

$$\lambda_{M \times (k-L+1)+b} = \max_{i \in \{0, \ldots, 2^M-1 \mid D_b^{-1}(i) = 1\}} (\xi_i) - \max_{i \in \{0, \ldots, 2^M-1 \mid D_b^{-1}(i) = 0\}} (\xi_i) \quad b \in \{0, \ldots, M-1\}$$

It should be noted that the LLRs could be improved by grouping first all the metrics corresponding to a decision 1, then all the metrics corresponding to a decision 0 and calculating the difference. Such an approach, although introducing a further computational load, provides better estimates of the LLRs since all the candidate metrics are used rather than just the maximum values. Non-linear processing techniques can be used for the process of combining the LLRs into the two groups.

From the foregoing description, it can be seen that the different computations required for the derivation of the LLRs are very complex. The demodulation architecture of FIG. 2 utilizes techniques that reduce the computational complexity of the demodulation process. This reduction in computational complexity is achieved mainly by pre-computing and storing some of the quantities required in the process of LLR calculation. By so doing, it is possible to avoid the duplicating some computations and thus achieve a more efficient receiver architecture.

The specific processes shown in FIG. 2 for implementing the above-described calculations for demodulating a received signal will now be described. The following description assumes that $L_f$ has been set to two. However, the proposed demodulator architecture can easily be extended to the cases where $L_f$ is greater than two.

As soon as the channel mapping $\{h_i\}_{i \in \{0, \ldots, L-1\}}$ is known (or is estimated), a product memory 201 can be populated. This table contains all the possible values for the complex products:

$$h_k \times c$$

where k assumes all possible values in the range $0 \leq k \leq L-1$ and c takes all possible values that are permitted for a modulation symbol in the modulation scheme M. For retrieval purposes, the product values $h_k \times c$ are indexed by the values k and i, where i is the modulation symbol index i which verifies $M(D^{-1}(i))=c$ for the value of c participating in the product.

These products are calculated for each channel coefficient $h_k$ (of which there are L) and each possible modulated symbol value c (of which there are $2^M$). Hence, the modulated channel table contains $2^M \times L$ complex entries.

The product memory 201 is calculated only once and it does not need to be re-computed for the update of the state metrics $\gamma_m(k+1)$ upon the presentation of each successive received symbol $r_k$.

The processing of the received symbol $r_k$ starts with the computation of symbol differences in unit 206. This involves the computation of all the complex symbol differences $r_k - h_0 \times c$ for all the possible values that a modulated symbol c can assume. These complex values are then stored in a symbol difference memory 202. The symbol difference memory 202 is dimensioned to contain the $2^M$ complex symbol differences $r_k - h_0 \times c$. These computations and the population of the symbol difference memory 202 are performed once for each received symbol in the burst (it will be recalled that a burst structure is being assumed for the transmitted signal for the purposes of this embodiment).

A state metrics memory 204 is provided and contains the values of all S state metrics awaiting adaptation upon receipt of the next symbol of the transmitted burst. The state metrics memory 204 therefore contains S entries. The size of each entry in the state metrics memory 204 depends on the selected numerical representation that is used for, and the desired accuracy required for, the state metrics. The size of these entries can be derived as a trade-off between demodulation performance and memory requirements.

A decision memory 203 is provided and this contains the set of previous decisions $\hat{c}_{k-u}(m)$ associated with each trellis state m. As there are S states and $L_r$ previous decisions $\hat{c}_{k-u}(m)$ associated with each trellis state, the decision memory 203 has to be dimensioned to hold $S \times L_r$ previous decisions. Rather than storing the actual sequence of previous modulation symbol decisions, it is more efficient to store the corresponding symbol indices i. For each modulated symbol c, the modulation symbol index i which verifies $M(D^{-1}(i))=c$ is stored in the decision memory. If this approach is selected, only M bits are required to store each i value, so the decision memory 203 is only S values deep and $L_r \times M$ bits wide.

The values held in the product memory 201, the symbol difference memory 202, the decision memory 203 and the state metrics memory 204 are combined in unit 207 to calculate all possible $S \times 2^M$ new candidate metrics. The computation of a given candidate metric first requires the calculation of the associated branch metric.

The branch metric computations are performed sequentially for each branch starting state, indexed by m, in sequence. For the branch starting state m, the contribution of the past decisions to the branch metrics is first calculated and stored:

$$\mu = \sum_{u=L_f}^{L_f+L_r-1} h_u \times \hat{c}_{k-u}(m)$$

It should be noted that even though there are $2^M$ branch metrics associated with each branch starting state m, the computation of the above equation only needs to be performed once for each branch starting state. Moreover, the value of µ is not required for the processing of the following states. Hence, for µ, memory provision only has to be made to store a single value as this value can be overwritten when progressing to the candidate metric calculations for the next value of m.

As indicated earlier, for memory efficiency reasons, it is preferred to store modulation symbol indices i rather than the complex modulated symbols $\hat{c}_{k-u}(m)$ in the decision memory 203. Each product value $h_k \times c$ required for µ is retrieved from the product memory 201 by reading the location within that memory that is indexed by the values k and i of the product concerned. Hence, the computation of the complex value µ only requires $L_r$ complex additions and $L_r$ memory accesses (one memory access representing the retrieval of one complex value $h_k \times c$).

Next, the contribution of the hypothesized symbols to the branch metrics is added to the partial sum µ such that µ becomes:

$$\mu = \sum_{u=1}^{L_f-1} h_u \times \hat{c}_{k-u} + \sum_{u=L_f}^{L_f+L_r-1} h_u \times \hat{c}_{k-u}(m)$$

The values $h_u \times \hat{c}_{k-u}$ for u=1 to $L_f-1$ are retrieved from the product memory 201 (again by indexing the memory 201 using u and i) and are accumulated with µ on a recursive basis to achieve the result set out in the preceding equation. This update to µ involves $L_f-1$ memory accesses and $L_f-1$ complex addition operations.

This partial sum µ is then stored and used to calculate the different branch metrics associated with the branch starting state indexed by m.

In order to calculate the $2^M$ branch metrics associated with the current branch starting state, the partial sum µ is combined with each entry from the symbol difference memory 202 in turn. For each branch metric, the partial sum µ is subtracted from an entry from the symbol difference memory 202 to produce:

$$r_k - \sum_{u=0}^{L_f-1} h_u \times \hat{c}_{k-u} - \sum_{u=L_f}^{L_f+L_r-1} h_u \times \hat{c}_{k-u}(p(m,i))$$

The squared magnitude of this result is then computed and the result, a branch metric, is stored in the candidate metrics memory 205. To calculate the next branch metric for the branch starting state, the next value in the symbol difference memory is read out and µ is subtracted from it. The calculation of the branch metrics is particularly efficient since the entries in the symbol difference memory are simply read out from beginning to end for combination with µ.

The candidate metrics memory 205 contains all $2^M \times S$ candidate metrics in the trellis although at this point, the entries in that memory merely contain branch metrics. The $2^M$ metrics associated with the branch starting state k are written into the locations $k \times 2^M$ to $(k+1) \times 2^M - 1$. The squared magnitudes associated with the branch starting state k are written sequentially.

Figure 3:
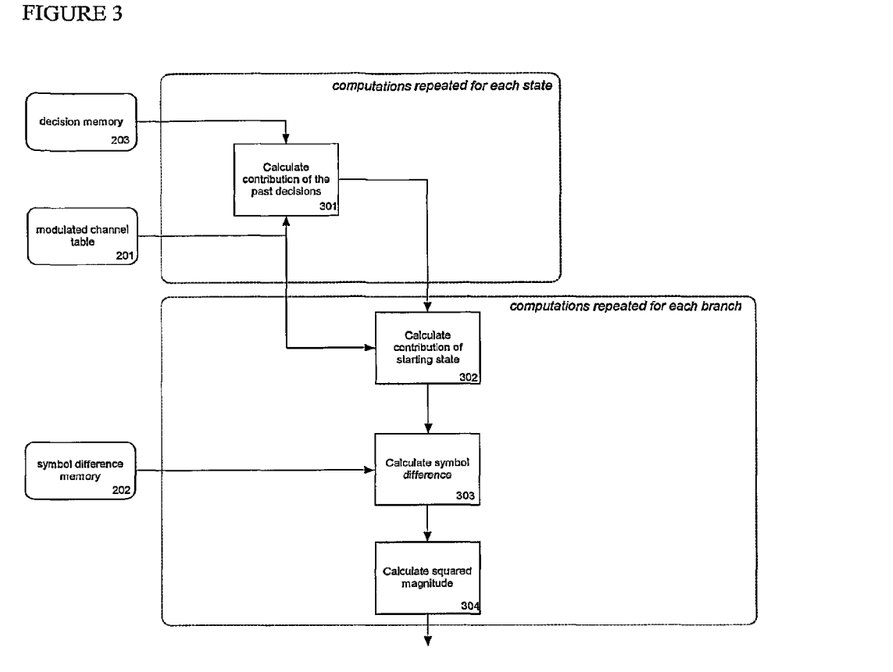
FIG. 3 presents how the different branch metrics are computed in the embodiment of the invention shown in FIG. 2.

The different computations performed for the derivation of the branch metrics are summarized in FIG. 3. The contribution to a given branch metric of the past modulation symbol decisions $\hat{c}_{k-u}$ (u=$L_f$ to $L_f+L_r-1$) is first calculated in unit 301 using the past decisions from the memory 203 and values from the product memory 201. These computations are performed for each of the S trellis states.

The contribution to the branch metric of the hypothesized symbols $\tilde{c}_{k-u}$, for u=1 to $L_f$-1 associated with the branch starting state is then added in unit 302. The resulting quantity is then combined in unit 303 with the symbol difference from the memory 202 corresponding to the symbol decision implied by the branch in question. The result is then squared in unit 304 to calculate the branch metric. The computations described in this paragraph need to be carried out for each of the $2^M \times S$ branch metrics.

As was indicated earlier, at this point, the values in the candidate metrics memory 205 do not correspond to candidate metrics since the contribution of the previous state metrics has not been included yet. Hence, each branch metric value is retrieved in turn from the memory and is then added to the state metric of the starting state of the trellis branch in question. It should be noted that each state metric is common to $2^M$ candidate metrics. After this addition process, each candidate metric value is stored in its original location in the candidate metrics memory 205. In other words, a Read-Modify-Write (RMW) process is performed for the $2^M$ candidate metrics corresponding to the branch starting state k.

The candidate metrics computations described in the preceding paragraph are repeated, for each branch starting state in turn, until the candidate metrics memory 205 has been populated in its entirety. Once this is done, the state metrics and the past decision symbols are updated by unit 208. The decision memory 203 and the state metrics memory 204 are updated as an output of this process, as will be described later.

In the candidate metrics calculation unit 207, candidate metrics were generated for each branch starting state in turn. This permits the re-use of the pre-computed values of memories 201 and 202, thus reducing the number of computations required for calculating the state metrics. However, in unit 208 that updates the state metrics, the processing is sequenced according to the branch ending, rather than the branch starting, states. Hence, the candidate metrics are not retrieved from the candidate metrics memory 205 for use by unit 208 with a fixed incremental offset of 1. Instead, a constant incremental offset equal to $2^M$ is used. Assume, for example, the branch ending state with index m is processed. In such a case, the values in the candidate metrics memory 205 at the locations m, m+$2^M$, ..., m+S-$2^M$ are retrieved by unit 208. As each state metric is retrieved, the best value (i.e. the minimum value) is kept. Once all $2^M$ metrics have been processed, the minimum value corresponds to the updated state metric $\gamma_m$(k+1).

Once the best candidate metric has been found for a given branch ending state $\alpha$, the associated past decision symbol information $\hat{c}_{k-u}(\alpha)$ (u=$L_f$ to $L_f$+$L_r$-1) is updated. This is achieved by taking the past decision symbols held in the memory 203 for the state $\beta$ corresponding to the branch-starting state of the branch producing the best candidate metric and combining them with $\hat{c}_{k-L_f+1}(\beta)$, i.e., where u=$L_f$-1.

When the past decisions associated with a given state are stored as a single word of $L_r \times M$ bits, the update of the information in the decision memory can be implemented in very efficient manner. The new decision word can be calculated by first shifting by M bits the decision word of the branch starting state corresponding to the best candidate metric. The index i of the earliest (position u=$L_f$-1) hypothesis symbol corresponding to this branch starting state is then combined with the decision word by using bit masking and bitwise OR operations.

Once the contents of the decision memory 203 and the state metrics memory 204 have been updated, the symbol A-Posteriori probabilities are calculated in unit 209. The $2^M$ symbol probabilities are then stored in a symbol probabilities memory 210. The symbol probability associated with the symbol c=M ($D^{-1}$(i)) is calculated by reading in turn the candidate metrics at the locations $2^M \times i$ to $2^M \times (i-1)+1$ within memory 205 and finding the best value. This process is repeated for all $2^M$ possible modulation symbols. Because the candidate metrics are read from the start of the memory 205 till the end with an increment in memory location equal to one, it is possible to implement these memory accesses in a very efficient manner.

Finally, in the last stage 211 of the demodulator architecture of FIG. 2, the LLRs for the M bits associated with the current received symbol $r_k$ are calculated. These values are calculated using the symbol probabilities stored in the symbol probabilities memory 210. The LLRs for the M bits are calculated one after the other, in no particular order. For the LLR of a given bit, the maximum (or minimum depending on the convention used for the branch metrics) of the $2^{M-1}$ symbol probabilities corresponding to the modulation symbols with the bit set to 1 is calculated. The same process is repeated for the $2^{M-1}$ probabilities corresponding to symbols with the bit set to 0. The difference between these two values is equal to the LLR of the given bit.

It should be noted that it is possible to combine the computations performed in unit 209 with those required for the derivation of the candidate metrics. Doing so would remove the need for the symbol probabilities memory 210. However, this would also mean that the best candidate metrics would have to be tracked as they were being computed.

In summary, a substantial reduction in computational complexity can be achieved by pre-computed and storing the following quantities $2^M \times L$ complex products of individual channel coefficients and individual modulation symbols $2^M \times S$ candidate metrics $2^M$ complex differences between the current received symbol and all modulation symbols modulated by the first propagation channel tap $h_0$ $2^M$ A-Posteriori symbol probabilities The proposed demodulator architecture also requires storage for the S different state metrics and the S different sequences of previous modulation symbols. However, this memory requirement is present for any receiver using the DDFSE architecture. Moreover, it has been shown that the amount of memory required for the past decision symbols can be reduced if the modulation symbol indices are stored rather than the actual complex modulation symbols. Moreover, this storage approach makes the update of the $\hat{c}_{k-u}$(u=$L_f$ to $L_f$+$L_r$-1) information very easy when a new symbol is received. Finally, it should be noted that, depending on the processor used to implement the proposed demodulation approach, the size of the state metrics and past decision symbols memories may need to be doubled in order to avoid over-writing information before it has been completely used.

Figure 4:
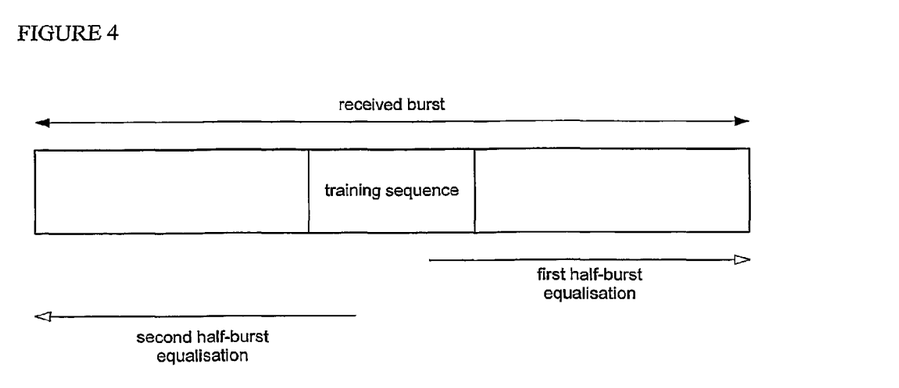
FIG. 4 describes how, in the E-GPRS system, received information can be equalized in two parts.

The initialization of the contents of the decision memory 203 and of the state metrics memory 204 will depend on the actual communication systems in which the proposed demodulator architecture is being used. If a sequence of known training symbols is inserted as part of the transmitted information, it is possible to use this information to set the initial past decision words $\hat{c}_{k-u}$(u=$L_f$ to $L_f$+$L_r$-1). The state metrics can also be initialized to values which will bias following decisions toward these known symbols. For example in the E-GPRS system, a training sequence is inserted in the middle of the burst of transmitted information. It is then recommended to perform the equalization of the received information in two sequences which start from the training sequence, as indicated in FIG. 4. The training bits can then be used to initialize the decision memory 203 and the state metrics memory 204.

It should also be noted that that the implementation of the derivation of the LLRs from the A-Posteriori probabilities may vary depending on the overall architecture. For example, if the receiver architecture is based on the RSSE approach, the processing of the A-Posteriori probabilities needs to be modified to take into account that the bit decisions can be made with different delays.

Another technique that can be used to further reduce the complexity of the demodulation computations set out above will now be described. This complexity reduction technique applies to the branch metric computations and is presented in FIG. 5. The reduction in complexity is achieved by splitting the $L_r$ channel coefficients into two sets. For the first $L_r^{St}$ coefficients $\{h_u\}_{L_f \leq u \leq L_r^{St}-1}$, the contribution to the branch metrics of the associated modulation symbols are calculated for each branch starting state in unit 502. However, for the last $L_r^{Sy}$ (where $L_r^{Sy}+L_r^{Sy}=L_r$) coefficients, $\{h_u\}_{L_f+L_r^{St} \leq u \leq L_f+L_r^{St}+L_r^{Sy}-1}$, the contribution to the branch metric of the modulation symbols is only calculated once in unit 501 with the result being used for all states. Hence, a complexity reduction of a factor of S is achieved for the computations associated with the last $L_r^{Sy}$ channel taps.

The technique that was presented for the update of the past decision symbols $\hat{c}_{k-u}$ ($u=L_f$ to $L_f+L_r-1$) is very efficient since it only requires bit shifting and bit setting operations to be performed. This technique, however, may not be optimum in terms of demodulation performance. Hence, an alternative approach will now be described.

For any given branch ending state, a new past decision word needs to be created from the $2^M$ old decision words of the $2^M$ starting branch starting states that have branches leading into the branch ending state. For each bit position in the new decision word, a bit is derived by gathering a set of bits consisting of the bits appearing at the same position in the group of $2^M$ old decision words. The state metrics of states whose past decision words contributed an even parity bit to the set are combined in a weighted sum and the state metrics of states whose past decision words contributed an odd parity bit to the set are likewise combined in a weighted sum. If the sum associated with the odd parity bit or bits is larger than the sum associated with the even parity bit or bits, then the bit at the present position in the decision word for the branch ending state is set to 1; otherwise, the bit at the present position in the decision word for the branch ending state is set to 0. Various techniques can be used for the computation of the weighted sums. In one possible implementation, the weights are derived from the probabilities associated with the different branch starting states. These probabilities can be derived from the state metrics.

Thus far, certain embodiments of the invention have been described in terms of architectures. As indicated earlier, these architectures can be implemented as software with suitable underlying hardware, such as that shown in FIG. 6.

Figure 6:
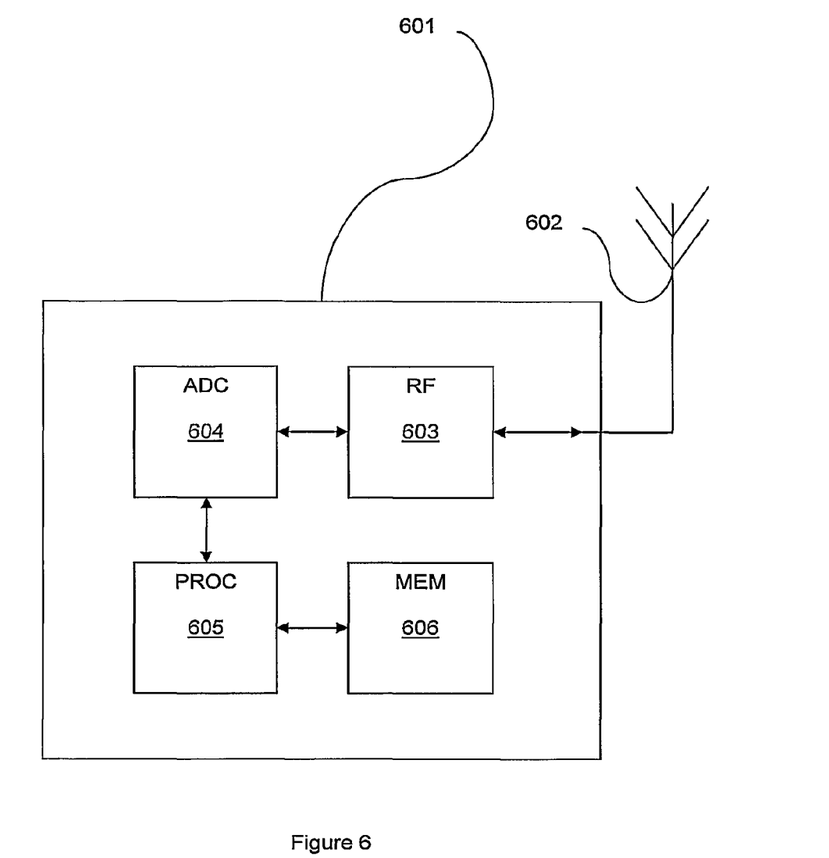
FIG. 6 presents a generic device in which an embodiment of the invention can be implemented.

FIG. 6 illustrates a generic structure that can represent a mobile telephone, base station or similar receiver in which the invention can be implemented. The receiver 601 comprises an antenna 602 for acquiring wireless signals, an RF section 603, an analogue-to-digital conversion (ADC) section 604, a data processor 605 and a memory 606. In practice, the receiver will contain many other elements but only those necessary for an explanation of the implementation of the invention have been shown.

Signals received at the antenna 602 are down-converted in frequency and amplified at RF section 603. The signals are then converted into digital signals by ADC section 604 and passed to processor 605. The processor 605 performs the operations necessary to extract and utilize the information payload of the acquired signals, relying on the memory 606 to provide storage of signal values and other data as required. The processor 605 undertakes the procedures of the architectures shown in FIGS. 2 and 3 and 2 and 5, utilizing memory resource 606 as necessary to provide storage of data required by those procedures.

What is claimed is:

1. A trellis processing apparatus for calculating and storing branch metrics in a reduced state trellis, comprising:
 a processor configured to:
  calculate, for each trellis state, a sum of products of signal symbol values and channel coefficient values, the channel coefficient values corresponding to delays larger than the maximum value represented by the trellis state, and
  initialize the branch metrics leading out of each trellis state with the calculated sum of products; and
 a memory configured to store the products.

2. The apparatus according to claim 1, wherein the processor is configured to compute candidate metrics for states in the trellis from the branch metrics calculated by the processor.

3. A trellis processing method for calculating branch metrics in a reduced state trellis, the method comprising:
 calculating, for each trellis state, a sum of products of signal symbol values and channel coefficient values, the channel coefficient values corresponding to delays larger than the maximum value represented by the trellis state;
 initializing the branch metrics leading out of each trellis state with the calculated sum; and
 storing the products in a memory.

4. The method according to claim 3, further comprising computing candidate metrics for states in the trellis from the branch metrics that have been calculated.

5. A non-transitory computer readable medium encoded with software comprising processor-executable instructions that, when executed by a data processing apparatus, cause the data processing apparatus to perform the functions of:
 calculating, for each trellis state, a sum of products of signal symbol values and channel coefficient values, the channel coefficient values corresponding to delays larger than the maximum value represented by the trellis state:
 initializing the branch metrics leading out of each trellis state with the calculated sum; and
 storing the products in a memory.

* * * * *